United States Patent
Bovankovich

(10) Patent No.: US 12,345,217 B2
(45) Date of Patent: Jul. 1, 2025

(54) RAMJET PROPULSION METHOD

(71) Applicant: Judith Marie Bovankovich, Orlando, FL (US)

(72) Inventor: Mark Bovankovich, Orlando, FL (US)

( * ) Notice: Subject to any disclaimer, the term of this patent is extended or adjusted under 35 U.S.C. 154(b) by 0 days.

(21) Appl. No.: 18/634,822

(22) Filed: Apr. 12, 2024

(65) Prior Publication Data

US 2024/0301844 A1 Sep. 12, 2024

Related U.S. Application Data

(62) Division of application No. 16/209,466, filed on Dec. 4, 2018, now Pat. No. 11,976,612, which is a division of application No. 14/069,454, filed on Nov. 1, 2013, now abandoned.

(60) Provisional application No. 61/723,906, filed on Nov. 8, 2012.

(51) Int. Cl.
| | | |
|---|---|---|
| *F02K 7/10* | (2006.01) | |
| *B64D 39/00* | (2006.01) | |
| *B64G 1/00* | (2006.01) | |
| *F02C 7/22* | (2006.01) | |
| *F02K 1/09* | (2006.01) | |

(Continued)

(52) U.S. Cl.
CPC ............... *F02K 7/10* (2013.01); *B64D 39/00* (2013.01); *B64G 1/002* (2013.01); *B64G 1/005* (2013.01); *F02C 7/22* (2013.01); *F02K 1/09* (2013.01); *F02K 7/16* (2013.01); *F02K 7/18* (2013.01); *F05D 2220/80* (2013.01); *Y02T 50/60* (2013.01)

(58) Field of Classification Search
CPC ..... F02K 7/10; F02K 7/16; F02K 7/18; F02K 1/09; F05D 2220/10; F02C 7/22; B64G 1/002; B64G 1/005; B64D 39/00
See application file for complete search history.

(56) References Cited

U.S. PATENT DOCUMENTS

| | | |
|---|---|---|
| 2,610,464 A | 9/1952 | Knoll |
| 2,873,074 A | 2/1959 | Harris, Jr. et al. |
| 2,915,747 A | 12/1959 | Segerstrom |

(Continued)

OTHER PUBLICATIONS

United Technologies Corporation, Chemical Systems Division, The Pocket Ramjet Reader, 1978, https://archive.org/details/cu31924104032820, chapter 9, pp. 51-53, Chemical Systems Division, United Technologies, Sunnyvale, CA.

*Primary Examiner* — Kyle Robert Thomas
(74) *Attorney, Agent, or Firm* — COOLEY LLP

(57) ABSTRACT

A method of propulsion includes providing a high-speed-launch ramjet boost (HSLRB) stage and HSLRB engine attached to a launch aircraft providing a speed ≥1.5 Mach. The HSLRB engine includes a combustion system and inlet(s) for air flow to the fuel injectors. A variable geometry (VG) nozzle having a nozzle actuator exhausts gas from combustion. A processor receives sensing signals from sensor(s) during flight that provides control signals to the nozzle actuator for dynamically controlling an aperture size of the VG nozzle, and if the inlet is a VG inlet to an inlet actuator to dynamically control the VG inlet shape. The HSLRB engine is ignited while attached to the aircraft at 1.5 to 1.99 Mach if assisting the aircraft to accelerate to 2.0 Mach, or at a speed of ≥2.0 Mach if the aircraft can accelerate to 2.0 Mach autonomously, then the HSLRB stage is separated from the aircraft.

20 Claims, 2 Drawing Sheets

(51) Int. Cl.
*F02K 7/16* (2006.01)
*F02K 7/18* (2006.01)

(56) References Cited

U.S. PATENT DOCUMENTS

| | | | |
|---|---|---|---|
| 3,094,072 A * | 6/1963 | Parilla | F02C 7/042 |
| | | | 60/768 |
| 3,214,905 A | 11/1965 | Beavers et al. | |
| 3,344,606 A | 10/1967 | Abernethy | |
| 3,482,403 A | 12/1969 | Polk, Jr. | |
| 3,533,238 A | 10/1970 | Marvin | |
| 3,563,467 A | 2/1971 | Marsh et al. | |
| 3,901,028 A | 8/1975 | Leingang | |
| 3,908,933 A * | 9/1975 | Goss | F02K 9/95 |
| | | | 60/768 |
| 3,974,648 A | 8/1976 | Kepler | |
| 4,265,416 A | 5/1981 | Jackson et al. | |
| 4,802,639 A * | 2/1989 | Hardy | B64C 37/02 |
| | | | D12/342 |
| 5,564,648 A | 10/1996 | Palmer | |
| 5,740,985 A | 4/1998 | Scott et al. | |
| 5,894,722 A | 4/1999 | Chevalier et al. | |
| 6,193,187 B1 | 2/2001 | Scott et al. | |
| 6,286,409 B1 * | 9/2001 | Na | F41F 3/052 |
| | | | 89/1.806 |
| 6,450,452 B1 | 9/2002 | Spencer et al. | |
| 6,508,435 B1 | 1/2003 | Karpov et al. | |
| 6,631,610 B1 | 10/2003 | Van Dyk | |
| 6,915,626 B2 | 7/2005 | Carton | |
| 6,932,302 B2 | 8/2005 | Martin | |
| 8,047,472 B1 | 11/2011 | Brand et al. | |
| 8,955,791 B2 | 2/2015 | Smith et al. | |
| 11,976,612 B2 | 5/2024 | Bovankovich | |
| 2004/0021040 A1 * | 2/2004 | Redding, Jr. | B64G 1/12 |
| | | | 244/158.9 |
| 2010/0162684 A1 * | 7/2010 | Baker | F02K 3/075 |
| | | | 60/226.3 |
| 2013/0299626 A1 | 11/2013 | Smith et al. | |
| 2014/0331682 A1 | 11/2014 | Bovankovich | |
| 2020/0025150 A1 | 1/2020 | Bovankovich | |

* cited by examiner

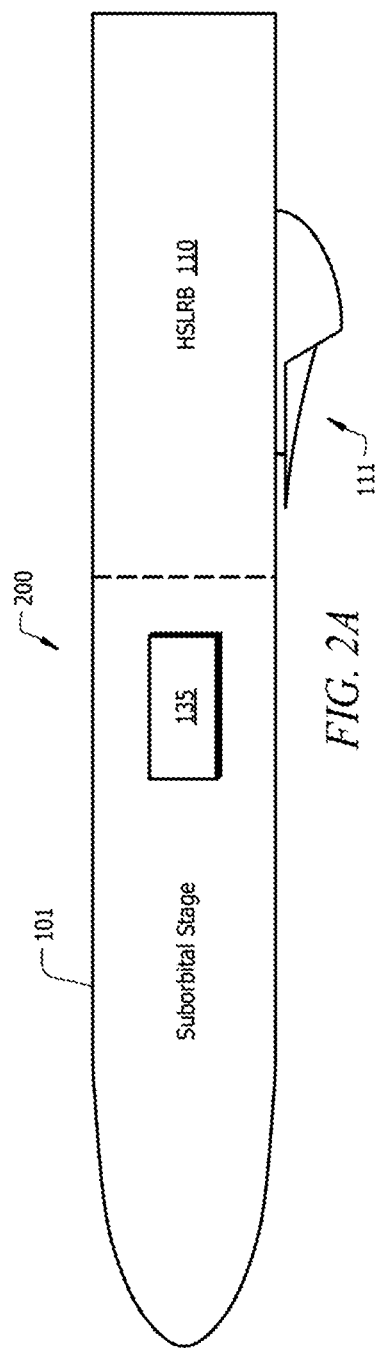
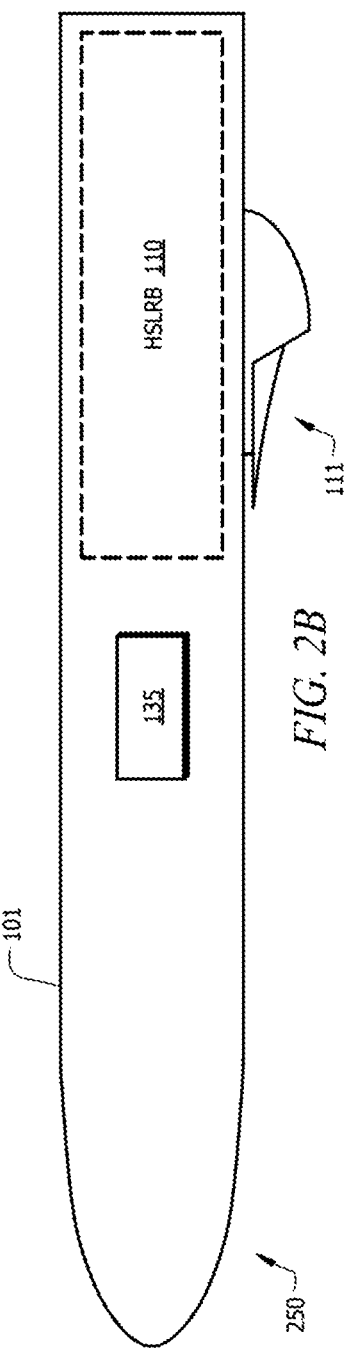

RAMJET PROPULSION METHOD

CROSS REFERENCE TO RELATED APPLICATIONS

This application is a divisional of U.S. patent application Ser. No. 16/209,466, filed Dec. 4, 2018, which is a divisional application of U.S. patent application Ser. No. 14/069,454 filed on Nov. 1, 2013 that claims the benefit of Provisional Application Ser. No. 61/723,906 entitled "HIGH-SPEED-LAUNCH RAMJET BOOSTER", filed Nov. 8, 2012, where each of these applications are herein incorporated by reference in their entirety.

FIELD

Disclosed embodiments relate to ramjet engines and ramjet-powered boost vehicles therefrom.

BACKGROUND

A ramjet engine (or stovepipe jet, or athodyd) is a form of air-breathing jet engine which uses the forward motion of the engine to compress incoming air which is fed via an inlet, without the need for a rotary air compressor. Ramjets have historically been used as cruise engines to power high-speed (typically 2.5-3.5 Mach) missiles.

Thrust for the ramjet is produced by passing hot exhaust generated from the combustion of a fuel through a jet nozzle. The nozzle accelerates the flow, and the reaction to this acceleration produces thrust. To maintain the exhaust flow through the nozzle, the combustion must occur at a pressure higher than the pressure at the nozzle exit. In a ramjet, this needed high relative pressure is produced by "ramming" external air into the combustor using the forward speed of the vehicle. Conventional ramjets have a fixed geometry (FG) inlet and a fixed FG nozzle.

The minimum operating speed for free flight is set by the particular ramjet design and the need for sufficient excess thrust for the ramjet to accelerate to higher speeds. The inlet and nozzle design will determine the minimum operating speed that will yield excess thrust (thrust minus drag) for separation and acceleration. When launched from a subsonic aircraft, ramjet-powered vehicles generally require a separate booster motor or vehicle to accelerate the ramjet to at least its minimum operating speed (typically 2 or more (2+) Mach) before lighting. This booster is typically a solid rocket, which significantly increases the size of the ramjet engine/vehicle.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include ramjet engines and ramjet-powered boost vehicles therefrom. Disclosed ramjet engines are generally referred to as high-speed-launch ramjet boost (HSLRB) engines, and do not require a conventional booster, such as a conventional solid rocket booster. In operation, the HSLRB engine is adapted to be launched from a high-speed aircraft, be ignited at a supersonic speed while still being attached to the aircraft, and generate enough excess thrust to enable launch (separation) from the aircraft at ≥2 Mach.

The HSLRB engine includes a variable geometry (VG) nozzle, and either a fixed geometry (FG) inlet(s) or a VG inlet(s). The VG nozzle manages the exhaust expansion ratio for the ramjet after separation through actuation by its actuator providing nozzle aperture expansion throughout the large (3.5+ Mach) speed range. The VG inlet can also be incorporated to provide more excess thrust at the low end of the ramjet's speed range, if desired, such as to support launch from a particular aircraft. The VG nozzle, and the optional VG inlet, is/are designed to provide excess thrust over a wide range of operating speed and altitude.

Disclosed HSLRB engines can be used as a first stage for air-launched microsatellites, with an additional rocket-powered stage(s) used for orbital insertion. By disclosed embodiments employing a high-speed supersonic aircraft to carry a disclosed HSLRB engine to ≥1.5 Mach, such as 2+ Mach, prior to ramjet launch, the size of the HSLRB engine can be substantially reduced by eliminating the need for a rocket booster (e.g., solid rocket booster) required for conventional ramjets. Thus, compared with other air-launch schemes, a HSLRB stage for microsatellite launch offers advantages including a significant decrease in overall vehicle mass and size, a smaller logistic footprint, decreased launch costs, and more easily adaptable mission profiles and basing/launch location flexibility.

Disclosed embodiments include a method of propulsion using a disclosed ramjet, comprising providing a disclosed HSLRB stage including a frame including a front portion and an aft portion, a fuel tank and fuel pump within the frame, and a HSLRB engine within the frame attached to a high-speed launch aircraft, where the high-speed launch aircraft provides a speed of at least 1.5 Mach.

The HSLRB engine includes a combustion system for igniting fuel pumped by the fuel pump from the fuel tank comprising an igniter, fuel injectors and frame holders. At least one inlet is for providing a pathway for air to flow within the frame toward the fuel injectors. A VG nozzle having a nozzle actuator is at the aft portion for exhausting exhaust gas from combustion of the fuel by the combustion system. A processor is coupled to receive sensing signals from at least one of a pressure sensor and a temperature sensor during flight, wherein the processor provides control signals to the nozzle actuator for dynamically controlling an aperture size of the VG nozzle, and if including VG inlet(s), also control signals to the inlet actuator to dynamically control the inlet shape and/or capture/throat area to supply compressed air to the combustion system.

The HSLRB engine is ignited while attached to the high-speed launch aircraft generally when the aircraft is at a speed of ≥2.0 Mach, or if the aircraft needs help with acceleration to 2.0 Mach, the HSLRB engine can be started when the aircraft has reached ≥1.5 Mach to assist the aircraft. Upon reaching the desired speed at least 2 Mach, such as at least approximately 2.2 Mach, the HSLRB stage is then separated from the high-speed launch aircraft. The HSLRB engine can generate sufficient excess thrust to separate from the high-speed launch aircraft and can also accelerate to a speed of ≥3 Mach (e.g., 3.5 Mach or more) more relative to its speed at the time of separating. The HSLRB stage can include one or more rocket-powered stages, including a payload releasably attached to the front portion of the HSLRB stage.

BRIEF DESCRIPTION OF THE DRAWINGS

FIGS. 2A and 2B are simplified depictions illustrating alternate embodiments utilizing the HSLRB engine shown in FIG. 1, with FIG. 2A showing an example ballistic launch vehicle with a disclosed HSLRB engine, while FIG. 2B shows a depiction of a high-speed cruise vehicle with a disclosed HSLRB engine, according to example embodiments.

DETAILED DESCRIPTION

Figure 1:
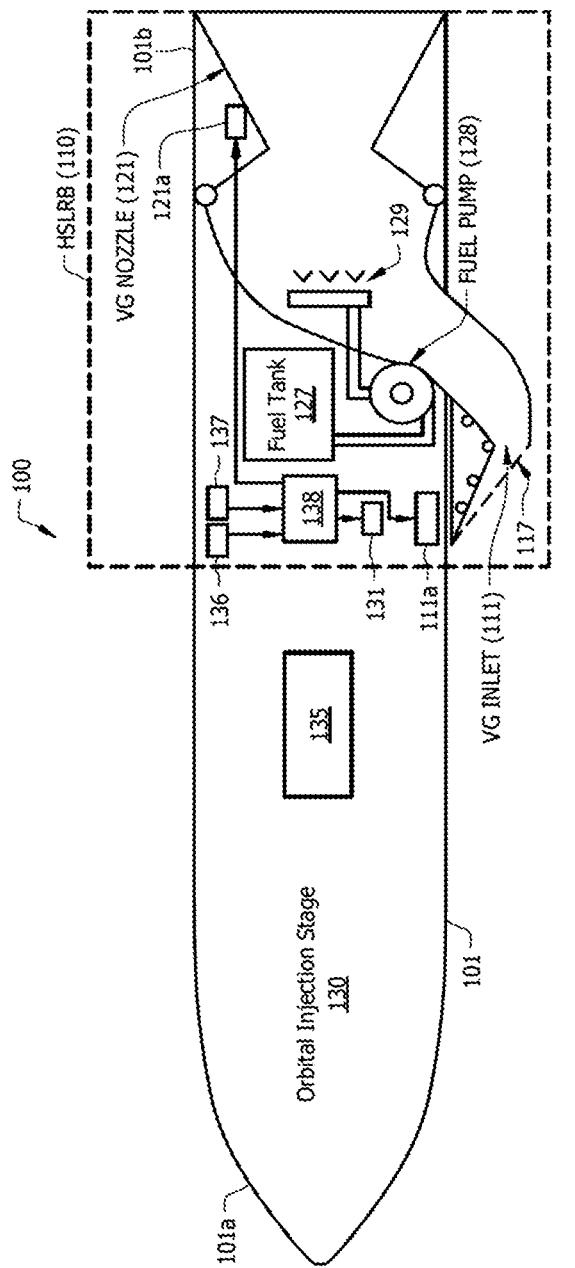
FIG. 1 is a simplified depiction of an example microsatellite launch vehicle having a disclosed HSLRB engine, showing the major components of the HSLRB engine, according to an example embodiment.

Disclosed embodiments are described with reference to the attached figures, wherein like reference numerals are used throughout the figures to designate similar or equivalent elements. The figures are not drawn to scale and they are provided merely to illustrate aspects disclosed herein. Several disclosed aspects are described below with reference to example applications for illustration.

It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

FIG. 1 is a simplified depiction of a microsatellite launch vehicle 100 having a disclosed HSLRB engine 110, showing major components of the HSLRB engine 110. In addition to the microsatellite launch vehicle 100 shown, as described below, the HSLRB engine 110 can also be used for a ballistic launch vehicle, or a high-speed cruise vehicle (see FIG. 2A and FIG. 2B, respectively, described below). The microsatellite launch stage presents a challenging set of system requirements, chief of which is generally to minimize mass, and is described in some detailed below. Briefly, a small increase in microsatellite launch stage mass can significantly decrease the payload mass.

For the microsatellite launch vehicle 100 as shown in FIG. 1, the HSLRB engine 110 is located behind a separate orbital injection stage 130 having at least one payload 135. The microsatellite launch vehicle 100 includes a frame 101 having a front portion 101a and an aft portion 101b which provides an outside framing structure for the orbital injection stage 130 and the HSLRB engine 110. The HSLRB engine 110 together with the frame 101, the fuel tank 127 and fuel pump 128 is referred to herein as a "HSLRB stage".

HSLRB engine 110 includes an inlet (or inlets), shown as an optional VG inlet 111 with an associated inlet actuator 111a. VG inlet 111 supplies more thrust at lower speeds compared to a conventional fixed inlet, with its utility reduced at faster speeds. However, as noted above, HSLRB engine 110 may alternately include a conventional fixed inlet.

HSLRB engine 110 includes a process/controller 138 (e.g., digital signal processor) hereafter processor 138, which is coupled to receive sensing signals from at least one of a pressure sensor and a temperature sensor during flight, with both a pressure sensor 136 and temperature sensor 137 being shown in FIG. 1. The processor 138 is programmed by disclosed algorithms in memory 131 that based on the level of the sensing signals provide control signals to the inlet actuator 111a for dynamically controlling a geometry of the VG inlet 111, which is described in more detail below.

HSLRB engine 110 also includes a VG nozzle (or nozzles) 121 having an associated nozzle actuator 121a. The processor 138 is programmed by programs in memory 131 that based on the level of the sensing signals to provides control signals to the nozzle actuator 121a for dynamically controlling an aperture size (or throat size) of the VG nozzle 121 at least after the separating from the high-speed launch aircraft, again described in more detail below.

Although VG nozzle 121 will tend to increase the complexity and cost of the HSLRB engine, the resulting propulsion system having a VG nozzle 121 has been recognized herein to provide a very wide Mach/altitude envelope by enabling a broad range of efficient operating Mach and altitude. A disclosed VG nozzle 121 provides high specific impulse (Isp) and throttle-ability that can support multiple missions, where the Isp and low-speed excess thrust may be enhanced by including a VG inlet 111.

As noted above, the dimensions of the VG inlet 111 and the size of the VG nozzle 121 are dynamically controlled by control signals provided by processor 138 running algorithms stored in memory 131 based on sensing signals from a pressure sensor 136 and/or temperature sensor 137. As known in the art, airspeed is derived from a combination of dynamic and static pressure, while Mach is derived from pressure and temperature. An analog to digital converter (ADC) for digitizing the sensing signals and a low pass filter for filtering the sensing signals, although generally provided, are not shown in FIG. 1 for simplicity. Typically, the size of the nozzle aperture of the VG nozzle 121 will be controlled to be largest at a relatively low Mach and smallest at a relatively high Mach to maintain the inlet terminal shock within acceptable bounds, and to provide near-ideal nozzle expansion.

At low Mach, the aperture of the VG nozzle 121 will be controlled to be at least substantially open, and it will be controlled to be closed down as Mach and ram pressure increase. In general, the aperture of the VG nozzle 121 is as closed (small) as possible to maximize the pressure, while avoiding increasing the pressure too rapidly, which can push the terminal shock out of the inlet. If a VG inlet 111 is used, the geometry of the VG inlet 111 will be controlled to maintain shock-on-lip operating conditions across the Mach range, thereby maximizing thrust and minimizing spillage drag.

HSLRB engine 110 includes a fuel tank 127 coupled to a fuel pump 128, such as an air-driven turbopump, to feed the fuel into fuel injectors, shown as combustion system 129 including fuel injectors, flameholders and igniter. Combustion is initiated by an igniter, generally either electrical or pyrotechnic, and is maintained by flameholders provided by fuel injectors in combustion system 129. The liquid fuel is generally a hydrocarbon, typically jet fuel or some similar formulation. Exhaust gas from the combustion of the fuel flows out through VG nozzle 121 to provide thrust for the microsatellite launch vehicle 100. Other configurations are also possible; e.g., a pressurized-gas system could replace the turbopump, or a solid fuel could be used with no tank, pump or injectors.

The VG inlet 111 can include movable ramps, a translating plug, or some other mechanism to provide near-isentropic compression and maintain shock-on-lip conditions in the primary-speed range. The specific type or location of VG inlet(s) 111 is generally not important, and a variety of different configurations for VG inlet 111 can be selected to meet packaging (i.e. placement of internal components) constraints. For simplicity, and to establish a conservative baseline, concept efficacy was assessed with a single, ventral external-compression inlet with VG horizontal compression ramps. An inlet capture area of 0.3 to 0.7 (approximately ½) the frontal area of the vehicle will generally provide a sufficient excess thrust to support a launch Mach of 2.2 and a staging Mach of 5.5+. This capture area also yields a maximum exit diameter for the VG nozzle 121 equal to the outside diameter of the vehicle so that the HSLRB stage's Isp and thrust can be maximized across wide ranges of Mach and altitude.

The VG inlet 111 can also be designed to operate with the inlet cover 117 shown in FIG. 1. The inlet cover 117 can comprise a frangible cover that is present only prior to HSLRB engine 110 ignition (shattered before igniting). An inlet cover 117 minimizes vehicle drag and eliminates inlet buzz, but adds some complexity and possibly some weight to the design of the VG inlet 111. These disadvantages may be traded off against the drag/buzz advantages to determine whether a cover mode is included. This determination might be launch aircraft specific, so different inlet designs might be employed for different launch aircraft.

No inlet cover may be used if the HSLRB engine is employed to help the launch aircraft accelerate to launch speed. In this embodiment, inlet "buzz" conditions would be avoided, or the duct constructed to be strong enough to survive a transient buzz. The added inlet drag due to lack of an inlet cover would not generally be an issue because the HSLRB engine 110 generally produces enough thrust to more than offset inlet drag.

As noted above, a frangible inlet cover can be used. A frangible inlet cover will generally be shattered just prior to ignition, and the pieces ingested into the VG inlet 111 and then expelled through the VG nozzle 121. As noted above, cover mode is also an option. With a VG inlet 111, the compression ramps, compression cone/plug, or translating cowl, could be moved in a manner that blocks most, if not all, of the flow into the VG inlet 111. If inlet buzz and drag are concerns, and a VG inlet is used, a cover mode could be an appropriate design.

The VG nozzle 121 is generally more important to the HSLRB engine 110 efficiency as compared to a turbojet or rocket because at lower Mach numbers, the ram pressure on the VG nozzle 121 is relatively low. The VG nozzle 121 is also generally important to maintaining critical inlet performance across a wide Mach range. Conventional boosted ramjets can employ fixed geometry nozzles because the booster accelerates the ramjet to a cruise Mach where the nozzle pressure ratio is higher. The specific form of VG nozzle 121 is generally not important, and can be 2D, 3D, or even fluidic. Efficiency, weight, complexity, cost, and packaging can drive the VG nozzle 121 type selection.

Although not shown, the HSLRB engine 110 will generally include an electrical generator or other source of electrical power (e.g., battery) to provide electrical power where needed to power the igniter (at least initially), the processor 138, and the nozzle actuator 121*a* and inlet actuator 111*a* if a VG inlet 111 is provided. Where an air-driven turbopump is used for the fuel pump 128, the same turbopump can drive a generator. It is noted the VG nozzle 121 and VG inlet 111 can be positioned using hydraulic or pneumatic instead of electrical actuators, where the controls for the hydraulics or pneumatics receive electrical power.

The non-electrical components of the HSLRB engine 110 can be constructed of a high-temperature-resistant material (e.g., metal alloy), and designed as a hot structure (i.e. a structure where part of the primary structure is not insulated from aerodynamic heating). This simplifies the design, although there might be a weight penalty. There is no need to use a hot structure for the orbital injection stage 130. Weight is generally not as important on the HSLRB engine 110 as on the orbital injection stage 130.

As noted above, an enabling aspect to operation of the HSLRB engine 110 is a high-speed launch from a supersonic launch aircraft. Nominal launch speed is about 2.2 Mach, but this can be varied by at least about 0.2 Mach depending on specific mission/payload requirements. In typical operation of the microsatellite launch vehicle 100, the HSLRB engine 110 is started (ignited) under the launch aircraft where it is held at a supersonic speed. If the launch aircraft has sufficient excess thrust to accelerate to launch conditions (e.g., ≥2.0 Mach) with no assistance, the HSLRB engine 110 can be started immediately before launch. If the launch aircraft needs assistance during acceleration, the HSLRB engine 110 can be started at a lower Mach (e.g., ~ 1.5 Mach).

Regarding a typical operation concept, if the HSLRB engine 110 is not needed to help the launch aircraft accelerate, the HSLRB engine can be started and then launched almost immediately thereafter. The HSLRB engine 110 can be started with a very rich fuel mixture to assure easy ignition, then the fuel control controlled by processor 138 or another processor can revert to a schedule that maximizes thrust-specific fuel consumption. The HSLRB engine 110 can go through an automated built-in-test (BIT) cycle, to ensure that all actuators (nozzle actuator 121*a* and optional inlet actuator 111*a*) are working properly, then can revert back to a stable idle after BIT is completed. Given a successful BIT, a retaining bolt may be retracted in the launcher, leaving only a shear bolt to restrain the HSLRB engine 110. The HSLRB engine 110 can then go to full throttle, and when excess thrust exceeds the shear strength of the restraint bolt, the microsatellite launch vehicle 100 would leave the rail.

If the launch pylon is plumbed, aircraft internal fuel can be used to run the HSLRB engine 110 during captive carry by either adding to jet fuel in the ramjet's fuel tank 127, or through a bypass line that would provide jet fuel to the fuel pump 128. Use of a bypass line would allow for captive carry operation on aircraft internal fuel while still providing a separate supply of fuel that is generally more compatible with higher temperatures associated with post-launch operation. The VG inlet 111 of the HSLRB engine 110 will generally maximize available thrust during sub-launch-Mach operation, and the thrust will offset drag of the microsatellite launch vehicle 100 and will assist launch aircraft acceleration until 2+ Mach is achieved.

Following HSLRB engine 110 launch, the HSLRB engine 110 can accelerate to its maximum Mach. The maximum speed can generally approach 6.0 Mach, but acceleration drops considerably above 5.5 Mach, so higher speeds typically offer diminishing returns. When acceleration is completed, the HSLRB engine 110 can begin a climb to staging conditions. For example, staging can occur at a nominal altitude/speed of 110,000 ft./5.5 Mach, although staging conditions can vary with mission requirements. Notably, the ability of the HSLRB engine 110 to achieve these high-speed/angle/altitude staging conditions allows the orbital injection stage 130 to employ a high-expansion-ratio rocket nozzle and to employ a simple gravity turn with minimal impact on drag/gravity losses, usually expressed as a change in velocity ($\Delta V$). The orbital injection stage 130 can then place the payload 135 into an elliptical parking orbit, which can be circularized if desired.

Disclosed aspects also include a method of propulsion using a ramjet including providing a HSLRB stage including a frame and a HSLRB engine attached to a high-speed launch aircraft which provides a speed $\geq 1.5$ Mach, such as $\geq 2.0$ Mach. If the high-speed aircraft cannot autonomously reach 2 Mach, as described above, the ramjet is ignited to assist reaching 2 Mach. The HSLRB engine includes at least one inlet that provides a pathway for air to flow within the frame toward the fuel injectors, where the inlet(s) can optionally be VG inlet(s). A VG nozzle is in an aft portion for exhausting exhaust gas. A processor receives sensing signals from a pressure sensor and/or a temperature sensor during flight including at least after the separating from the high-speed launch aircraft that provides control signals to a nozzle actuator for dynamically controlling a size of VG nozzle, and in the case of a VG inlet to inlet actuator(s) to also dynamically control the VG inlet shape and/or capture/throat area to dynamically supply compressed air to the combustion system.

The HSLRB stage is carried by the aircraft to a speed of at least 2.0 Mach. If the aircraft is autonomously capable of accelerating to a speed greater than 2.0 Mach while carrying the HSLRB stage, the HSLRB engine is then ignited, and the HSLRB stage is quickly separated from the aircraft. If the aircraft lacks sufficient thrust to reach 2.0 Mach while carrying the HSLRB, the HSLRB engine is ignited, at least partially offsetting the drag of the HSLRB thereby helping the aircraft accelerate to at least 2.0 Mach, then the HSLRB stage is separated from the aircraft.

The disclosed use of a ramjet designed for efficient operation over a wide possible range of Mach enabled by the VG nozzle and optional VG inlet with a high-speed launch aircraft that provides a speed of at least 1.5 Mach, significantly has the technical effect of bridging the gap between what a turbine engine can do and where a rocket is required, to achieve the high energy state needed for deployment of payloads to ballistic, sub-orbital (ballistic in space), orbital, or extra-orbital trajectories.

FIG. 2A and FIG. 2B are simplified depictions that illustrate alternate embodiments of the HSLRB engine 110 configured as a ballistic launch vehicle 200 with HSLRB engine 110 and a high-speed cruise vehicle 250 with HSLRB engine 110, respectively. For use of HSLRB engine 110 as a ballistic launch vehicle 200, this embodiment is similar to the microsatellite launch vehicle 100 except that the latter stage(s) has no requirement to achieve orbit. The HSLRB engine 110 is generally provided sufficient fuel for an extended range. The vehicle stage split can be altered to provide cruise range on the HSLRB engine 110; and the payload 135 can be increased above that possible to deliver to the orbital injection stage 130, and/or the configuration of the latter stage(s) could be substantially altered to meet mission needs. This embodiment covers all multi-stage, non-orbital vehicles that employ disclosed HSLRB engine launch schemes.

For the high-speed cruise vehicle 250 shown in FIG. 2B, the HSLRB engine 110 is generally a single-stage, long range, high-speed cruise vehicle. Depending on altitude and range requirements, wings, larger fins, or a lifting-body/waverider fuselage might be employed. The payload 135 can be substantially increased, and considerable additional ramjet fuel can be carried, depending on mission needs. This embodiment covers all single-stage, high-speed cruise vehicles that employ disclosed HSLRB launch schemes.

Regarding features believed to be unique regarding operation of a disclosed HSLRB engine 110, one such feature is high-speed launch. The use of a high-speed (e.g., $\geq 2.0$ Mach) launch aircraft instead of a conventional booster enables the HSLRB engine/stage to operate at high Isp across the range of approximately 2 through 5.5 Mach. A ramjet has approximately 3 to 4 times the Isp of a rocket across this speed range, thus significantly reducing the size and mass of the stage required to transit this speed range. The VG nozzle 121 (particularly with VG inlet 111) enable a broad range of efficient operating Mach and altitude.

The operation Mach/altitude are also believed to be unique for ramjets. Disclosed HSLRB engines are also believed to be unique in its use for an unmanned air-launched vehicle that can operate solely in the supersonic/hypersonic regime. The use of a ramjet with high excess thrust allows a rocket-propelled orbital injection stage to be started at high speed, high altitude and high angle. High speed is generally important, and is the most important of these three factors. High angle allows the orbital injection stage to rapidly accelerate with a minimum of drag loss and gravity $\Delta V$ loss compared with horizontal staging.

A high flight path angle at staging of approximately 30 degrees allows a gravity turn to be employed for much of the orbital injection profile with a minimum increase in gravity and drag $\Delta V$ loss. High altitude reduces aerodynamic drag and allows a high-expansion-ratio nozzle to be employed on the orbital injection stage rocket, maximizing the Isp of that engine, which helps maximize orbital payload.

An advantageous application for a disclosed HSLRB engine is as a stage in an air-launched microsatellite launch vehicle, such as microsatellite launch vehicle 100 shown in FIG. 1 described above. Another advantageous application is as a stage in a ballistic suborbital vehicle or weapon, analogous to ballistic launch vehicle 200 shown in FIG. 2A described above. Yet another advantageous application is for propulsion of a high-speed cruise vehicle for intelligence, surveillance and reconnaissance (ISR) or research, analogous to high-speed cruise vehicle 250 shown in FIG. 2B described above.

Significant advantages of disclosed HSLRB engines include materially reducing the launch footprint and cost of microsatellite air-launch. For a given payload, the HSLRB can reduce the size and mass of the satellite launch vehicle's first stage by a factor of approximately 4x. Disclosed HSLRB engines can also reduce the size and mass of a latter stage(s) by providing higher speed/angle/altitude staging conditions. These reductions in size and mass increase the available launch platforms from custom dedicated assets, such as Virgin Galactic's White Knight 2, to the USAF's entire fleet of F-15s and privately-operated 2 Mach fighters. Competing proposals to a 2,300 lb disclosed HSLRB engine generally weigh from 10,000 to 25,000 lb., with approximately the same payload. In addition, disclosed HSLRB engines offer a smaller logistics footprint, lower launch costs, and increased mission flexibility and basing/launch location flexibility.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The terminology used herein is for the purpose of describing particular embodiments only and is not intended to be limiting to this Disclosure. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this Disclosure belongs. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The invention claimed is:

1. An apparatus, comprising:
   an airplane configured for horizontal takeoff and to accelerate to a speed of at least 1.5 Mach;
   a high-speed launch ramjet boost (HSLRB) stage coupled to the airplane, the HSLRB stage configured to separate from the airplane; and
   a rocket-powered stage coupled to the HSLRB stage; and
   at least one controller configured to:
      ignite the HSLRB stage after the airplane has reached the speed of at least 1.5 Mach and
      launch the rocket-powered stage from the HSLRB stage at a predetermined speed of the HSLRB stage below 6.0 Mach.

2. The apparatus of claim 1, wherein the at least one controller is configured to ignite the HSLRB stage after the HSLRB stage separates from the airplane.

3. The apparatus of claim 1, wherein the at least one controller is configured ignite the HSLRB stage while the HSLRB stage is coupled to the airplane.

4. The apparatus of claim 1, wherein the at least one controller is configured to ignite the HSLRB stage while the HSLRB stage is coupled to the airplane to cause the airplane to accelerate to a speed of at least 2.0 Mach before the HSLRB is separated from the airplane.

5. The apparatus of claim 1, wherein the at least one controller is configured to ignite the HSLRB stage after the airplane reaches a speed of at least 2.0 Mach.

6. The apparatus of claim 1, wherein the HSLRB includes a variable geometry nozzle.

7. The apparatus of claim 1, wherein the airplane includes a fuel tank fluidically coupled to the HSLRB stage and configured to supply fuel to the HSLB stage while the HSLRB stage is coupled to the airplane.

8. The apparatus of claim 1, wherein:
   the airplane includes a first fuel tank fluidically coupled to the HSLRB stage and configured to supply fuel to the HSLB stage while the HSLRB stage is coupled to the airplane; and
   the HSLRB stage includes a second fuel tank configured to supply fuel to a ramjet engine of the HSLRB stage after the HSLRB stage separates from the airplane.

9. The apparatus of claim 1, further comprising a payload coupled to the rocket-powered stage, the payload configured to be launched into orbit from the rocket-powered stage after the rocket powered stage is launched from the HSLRB stage.

10. An apparatus, comprising:
    an airplane configured for horizontal takeoff;
    a high-speed launch ramjet boost (HSLRB) stage coupled to the airplane, the HSLRB stage configured to separate from the airplane;
    a rocket-powered stage coupled to the HSLRB stage; and
    at least one controller configured to:
       cause the HSLRB stage to separate from the airplane at a speed of at least 2.0 Mach and
       launch the rocket-powered stage from the HSLRB stage at a predetermined speed below 6.0 Mach.

11. The apparatus of claim 10, wherein the HSLRB stage includes a variable geometry (VG) nozzle, including a nozzle actuator configured to exhaust combustion gases.

12. The apparatus of claim 10, further comprising a shear bolt coupling the HSLRB stage to the airplane, the HSLRB stage configured to separate from the airplane when a force generated by a ramjet engine of the HSLRB stage exceeds a shear strength of the shear bolt.

13. The apparatus of claim 10, wherein the at least one controller is configured to execute a built-in-test cycle prior to the HSLRB stage separating from the airplane.

14. The apparatus of claim 10, wherein the HSLRB stage includes an air-breathing engine operable up to an altitude of 110,000 feet.

15. The apparatus of claim 10, wherein:
    the HSLRB stage includes an air-breathing engine operable up to an altitude of 110,000 feet; and
    the at least one controller is configured to launch the rocket-powered stage from the HSLRB after the HSLRB stage reaches 110,000 feet.

16. The apparatus of claim 10, further comprising a payload coupled to the rocket-powered stage, the rocket-powered stage configured to release the payload into orbit.

17. An apparatus, comprising:
    an airplane configured for horizontal takeoff; and
    at least one controller operably coupled to a memory storing instructions to cause:
       a high-speed launch ramjet boost (HSLRB) stage coupled to the airplane to ignite after the airplane has reached a speed of at least 1.5 Mach and a rocket-powered stage coupled to the HSLRB stage to be launched from the HSLRB stage in response to the HSLRB stage reaching a predetermined speed below 6.0 Mach.

18. The apparatus of claim 17, further comprising a pylon coupling the HSLRB stage to the airplane, the pylon including a fuel line configured to supply fuel to an engine of the HSLRB stage from a fuel tank disposed within the airplane.

19. The apparatus of claim 17, wherein HSLRB stage includes:
   a fuel tank;
   a fuel pump;
   a combustion system including a fuel injector for igniting fuel pumped by the fuel pump from the fuel tank through the fuel injector;
   an inlet providing a pathway for air to flow toward the fuel injector;
   a variable geometry (VG) nozzle having a nozzle actuator for exhausting exhaust gas from combustion of the fuel by the combustion system; and
   a processor coupled to receive sensing signals from at least one of a pressure sensor and a temperature sensor during flight, wherein said processor provides control signals to said nozzle actuator for dynamically controlling an aperture size of said VG nozzle.

20. The apparatus of claim 17, further comprising:
   the HSLRB stage;
   the rocket-powered stage; and
   a payload coupled to the rocket-powered stage,
   the at least one controller further comprising instructions to cause the rocket-powered stage to release the payload into orbit.

* * * * *